(12) United States Patent
Wadland et al.

(10) Patent No.: US 7,017,137 B2
(45) Date of Patent: Mar. 21, 2006

(54) TOPOLOGICAL GLOBAL ROUTING FOR AUTOMATED IC PACKAGE INTERCONNECT

(75) Inventors: Ken Wadland, Grafton, MA (US); Glendine Kingsbury, Bedford, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 364 days.

(21) Appl. No.: 10/357,642

(22) Filed: Feb. 3, 2003

(65) Prior Publication Data

US 2003/0126578 A1    Jul. 3, 2003

Related U.S. Application Data

(63) Continuation of application No. 09/886,265, filed on Jun. 22, 2001, now Pat. No. 6,516,447.

(51) Int. Cl.
*G06F 17/50* (2006.01)

(52) U.S. Cl. .................................. 716/13; 716/15

(58) Field of Classification Search ............ 716/1–2, 716/4, 11–16; 257/688, 697, 737, 738
See application file for complete search history.

(56) References Cited

U.S. PATENT DOCUMENTS

| | | | | |
|---|---|---|---|---|
| 5,856,927 A | * | 1/1999 | Greidinger et al. | 716/12 |
| 6,057,169 A | * | 5/2000 | Singh et al. | 438/14 |
| 6,111,859 A | | 8/2000 | Godfrey et al. | |
| 6,225,143 B1 | * | 5/2001 | Rao et al. | 438/106 |
| 6,226,560 B1 | * | 5/2001 | Hama et al. | 700/97 |
| 6,230,299 B1 | | 5/2001 | McSherry et al. | |
| 6,247,161 B1 | | 6/2001 | Lambrecht et al. | |
| 6,266,797 B1 | | 7/2001 | Godfrey et al. | |
| 6,275,975 B1 | | 8/2001 | Lambrecht et al. | |
| 6,415,422 B1 | | 7/2002 | Mehrotra et al. | |
| 6,510,539 B1 | * | 1/2003 | Deemie et al. | 716/2 |
| 6,574,780 B1 | * | 6/2003 | Le Coz | 716/4 |

OTHER PUBLICATIONS

S.-S. Chen et al., "An Even Wiring Approach to the Ball Grid Array Package Routing," 1999 ICCD, pp. 303-306.*
W. Dai et al., "Routability of a Rubber-Band Sketch," 28th ACM/IEEE DAC, 1991, pp. 45-48.*
T. Hama et al., "Curvilinear Detailed Routing with Simultaneous Wire-Spreading and Wire-Fattening," IEEE Trans. on CAD of ICs and Systems, vol. 18, No. 11, 1999, pp. 1646-1653.*

(Continued)

*Primary Examiner*—Leigh M. Garbowski
(74) *Attorney, Agent, or Firm*—Bingham McCutchen LLP

(57) ABSTRACT

An automated method and system is disclosed to determine an Integrated Circuit (IC) package interconnect routing using a mathematical topological solution. A global topological routing solution is determined to provide singular ideal IC package routing solution. Topological Global Routing provides a mathematical abstraction of the problem that allows multiple optimizations to be performed prior to detailed routing. Preliminary disregard of electrical routing segment width and required clearance allows the global topological solution to be determined quickly. The global topological solution is used in conjunction with necessary design parameters to determine the optimal geometric routing solution. Guide points are determined using the geometric routing solution. A detail router uses the guide points as corners when performing the actual routing.

41 Claims, 7 Drawing Sheets

OTHER PUBLICATIONS

C. Leiserson et al., "Algorithms for Routing and Testing Routability of Planar VLSI Layouts," Proc. 17th ACM Symposium on Theory of Computing, 1985, pp. 69-78.*

P. Wu et al., "ViperBGA: A Novel Design Approach to High Performance and High Density BGA's," 1997 IEEE/CPMT Int'l Electronics Manufacturing Technology Symposium, pp. 386-390.*

M.-F. Yu et al., "Single-Layer Fanout Routing and Routability Analysis for Ball Grid Arrays," Proc. 1995 IEEE/ACM Int'l Conference on CAD, (no page No.).*

M.-F. Yu et al., "Interchangeable Pin Routing with Application to Package Layout," ICCAD '96, pp. 668-673.*

C. Ying et al., "Automated Pin Grid Array Package Routing on Multilayer Ceramic Substrates," IEEE Trans. on VLSI Systems, vol. 1, No. 4, 1993, pp. 571-575.*

* cited by examiner

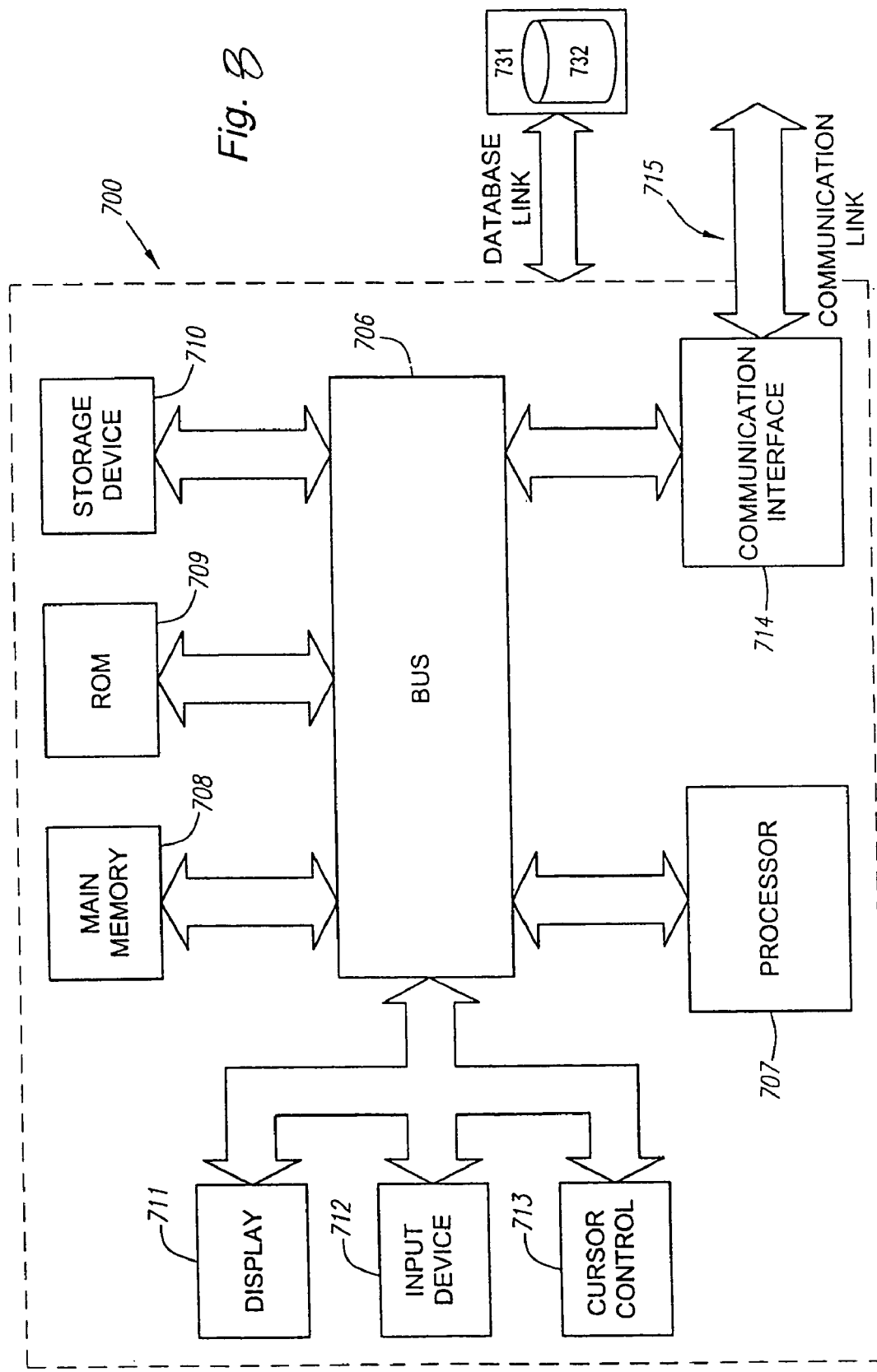

TOPOLOGICAL GLOBAL ROUTING FOR AUTOMATED IC PACKAGE INTERCONNECT

RELATED APPLICATIONS DATA

This application is a continuation of U.S. patent application Ser. No. 09/886,265, filed Jun. 22, 2001, now U.S. Pat. No. 6,516,447 the disclosure of which is expressly incorporated by reference herein.

TECHNICAL FIELD

The invention relates to a system and method of determining an Integrated Circuit (IC) package interconnect routing.

BACKGROUND

As designers strive to improve the capabilities of new ICs, minimization of circuit size continues to be an underlying goal. Recent developments in IC design have dramatically increased the power, speed, and capability of the IC. As the power, speed, and capability of ICs increase, the number of input output terminals that each IC is interconnected with has also increased.

Normally, Integrated Circuits (ICs) are placed inside a "package" before they can be installed on a Printed Circuit Board (PCB). IC Package Interconnect is the process of designing the electrical tracks between the terminals on the IC die and the pads on the package. Using Electronic Design Automatic (EDA) tools, the human designer takes net data from the IC die and footprint data from the PCB package. The designer then uses this data to design the electrical tracks within the package to connect the IC die to the substrate. Once these connections are made a connection is made to the package pins.

Only a few years ago, most packages had only a few dozen or at most a few hundred pads. The routing required to connect to these pads was not particularly difficult or time consuming. Modern Ball Grid Array (BGA) packages now routinely have hundreds or thousands of pads. Some have over ten thousand pads. A task that previously took a few hours can now take days or even weeks. Thus, an automated solution is needed.

One approach is to use design tools which require a designer to manually determine each interconnect wire in an IC package. As the complexity of IC packages has increased, such a solution has obvious shortcomings. Another approach is to use design tools such as "Advanced IC Packaging"™ by Zuken™ include a packaging specific auto-router, traded under the name "Radial Router"™. These routers use all-angle auto routing with packaging-specific algorithms. They use a direct line-of-sight approach to solving the problems specific to BGA and CSP rather than traditional horizontal/vertical routing. Innoveda™ also has a package design solution, traded under the name "PowerBGA"™. This tool has an optional router, which they call the "BGA Route Wizard". This product appears to be similar in design to the Zuken Radial Router. While these other approaches are suitable for simple designs, they have difficulty providing routing solutions for complex ICs.

Therefore, it is highly desirable to provide an automated system and method to provide an optimal routing solution for highly complex IC packages.

SUMMARY

While automated IC package routing systems and methods exist, no automated system or method exists to provide routing to complex IC designs. In particular, no automated system or method exists to provide a routing solution for IC packages using large, multi-layer Ball Grid Array (BGA) designs. Therefore, it is desirable to provide a system and method of automated IC package routing for complex IC designs. One embodiment of the present invention utilizes Topological Global Routing to determine the optimal IC package routing solution. Embodiments of the present invention provide a system and method for automatically determining the optimal solution for IC Package Interconnect for large Ball Grid Array (BGA) designs.

Topological Global Routing provides a mathematical abstraction of the problem that allows multiple optimizations to be performed prior to detailed routing. In the special case of IC Package Interconnect, the algorithms are able to find the optimal solution in less time than other methods can find an approximate solution.

BRIEF DESCRIPTION OF THE DRAWINGS

FIG. 8 illustrates a system for determining an interconnect routing solution.

DESCRIPTION OF THE PREFERRED EMBODIMENTS

Preferred embodiments will now be described, with reference as necessary to the accompanying drawings.

Figure 1:
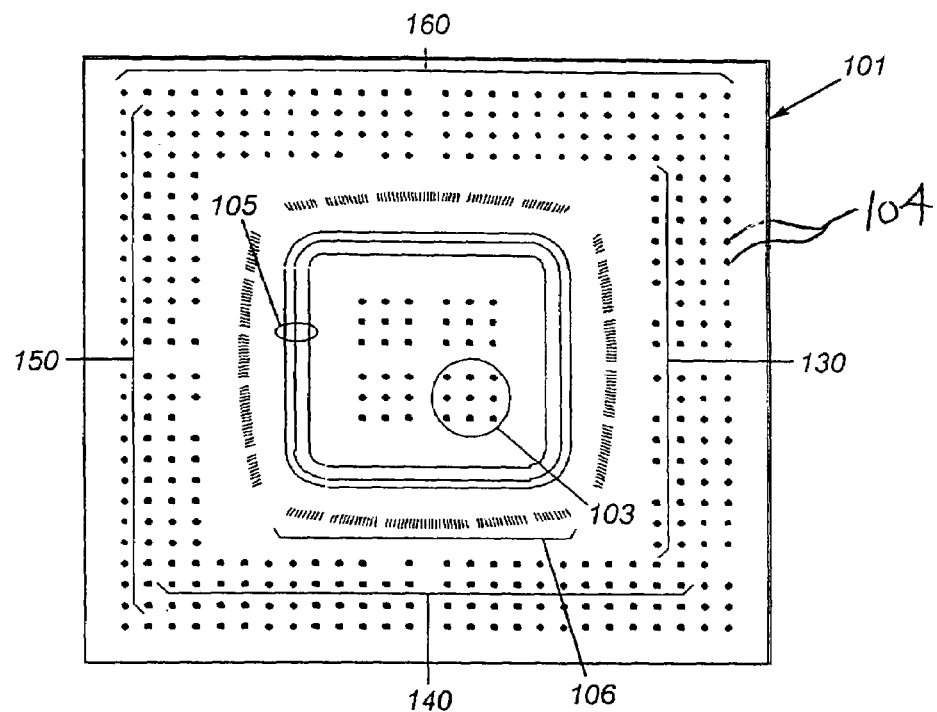
FIG. 1 illustrates an example of an IC package before it has been routed.

FIG. 1 shows an example of an IC Package 101 before it has been routed. The IC circuit is placed in the center of the package with IC circuit ball pads 103 and is ringed by IC package ball pads 130, 140, 150, 160 (collectively 104). The example of an IC package 101 shown in FIG. 1 has 4 rings of IC package ball pads 104 around the outside edge and a 6×6 matrix of IC circuit ball pads 103 in the center. The three solid rings 105 are called "power rings". Multiple terminals of the IC may be connected to the power rings 105 but do not require a determination of a topological solution to make such connections. FIG. 1 also illustrates four arcs composed of small rectangular pads, called bond pads 106. The IC circuit has its I/O terminals routed to the each of the IC circuit ball pads 103. These IC circuit ball pads 103 act as terminals for the IC and are in turn electrically connected to various bond pads 106 and power rings 105. Some ball pads 103 may be electrically connected to the same bond pad 106 and some ball pads 103 may be connected to multiple bond pads 106.

When routing electrical tracks 129 (shown in FIG. 6) between bond pads 106 to IC package ball pads 104, one approach uses traditional Euclidean Geometry. That is, any location can be uniquely specified as a pair of Cartesian coordinates. The electrical routing tracks 129 are routed between bond pads 106 to IC package ball pads 104. Topological Global Routing delays the computation of Cartesian coordinates until after a global topological solution has been found. Other approaches of routing involve determining a plurality of possible geometric solutions of possible routing solutions from the bond pads 106 to corresponding ball pads 104. These other methods then determine the optimal solution among the multiple geometric solutions. Conversely, by determining a global topological solution, embodiments of the present invention determines the only possible topological solution first and then translates the topological solution into the optimal geometric solution.

Figure 2:
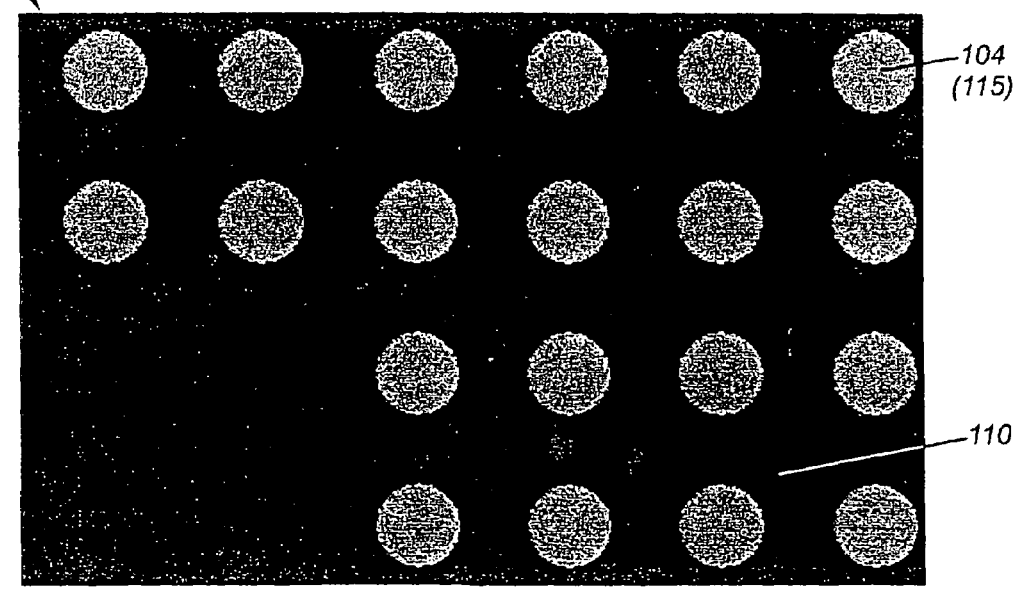
FIG. 2 illustrates a magnified view of the boundaries and regions of the ball grid array used in BGA designs.

FIG. 2 illustrates a magnified view of the IC package ball pads 104 surrounding the outside edge of the IC circuit 6×6 matrix of ball pads 103. Embodiments of the present invention seek to determine the optimal solution to route electrical tracks 129 (shown in FIG. 6) from the bond pads 106 to corresponding IC package ball pads 104. Embodiments of the present invention first divide the design into "regions" 110 separated by "boundaries" 115. The "boundaries" 115 may refer to the ball pads 104 or their vias or the other electrical tracks 129 connected to other ball pads 104. The regions 110 refer to the channels between the IC package ball pads 104. For each connection, the global router used by an embodiment of the present invention determines a solution set consisting of the various paths taken for each bond pad electrical tracks 129 through the IC ball grid array.

A preferred embodiment of the present invention determines the topological paths 129' (FIG. 5) through the ball pad field. As opposed to a geometric path used by other routing approaches, a topological path 129' can be considered to have a zero-width and a zero-clearance track. Because the topological state contains far less information than the geometric state, the global router can select paths much faster than a geometric router can.

Figure 3:
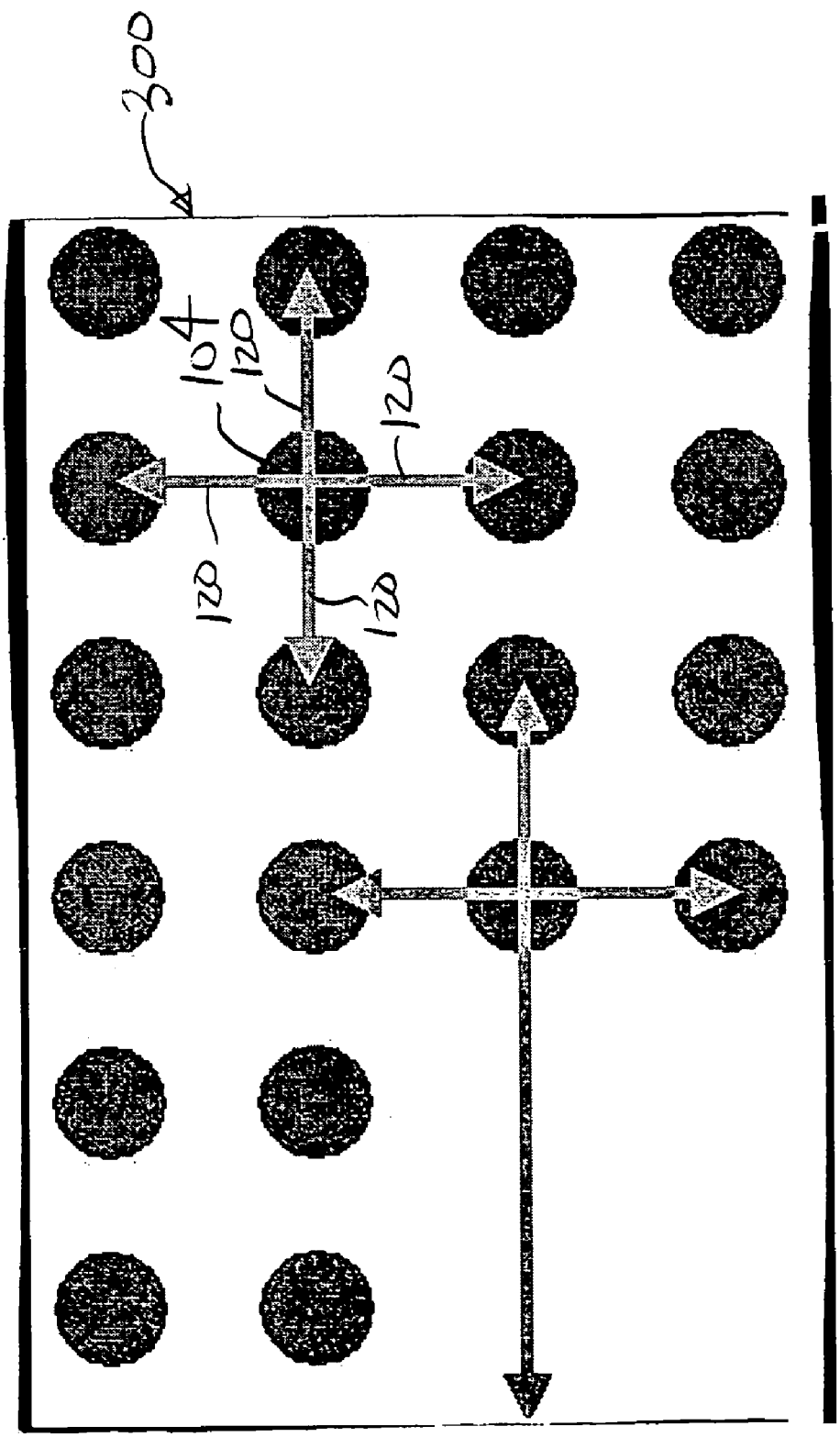
FIG. 3 illustrates a matrix graph generated by embodiments of the present invention.
Figure 4:
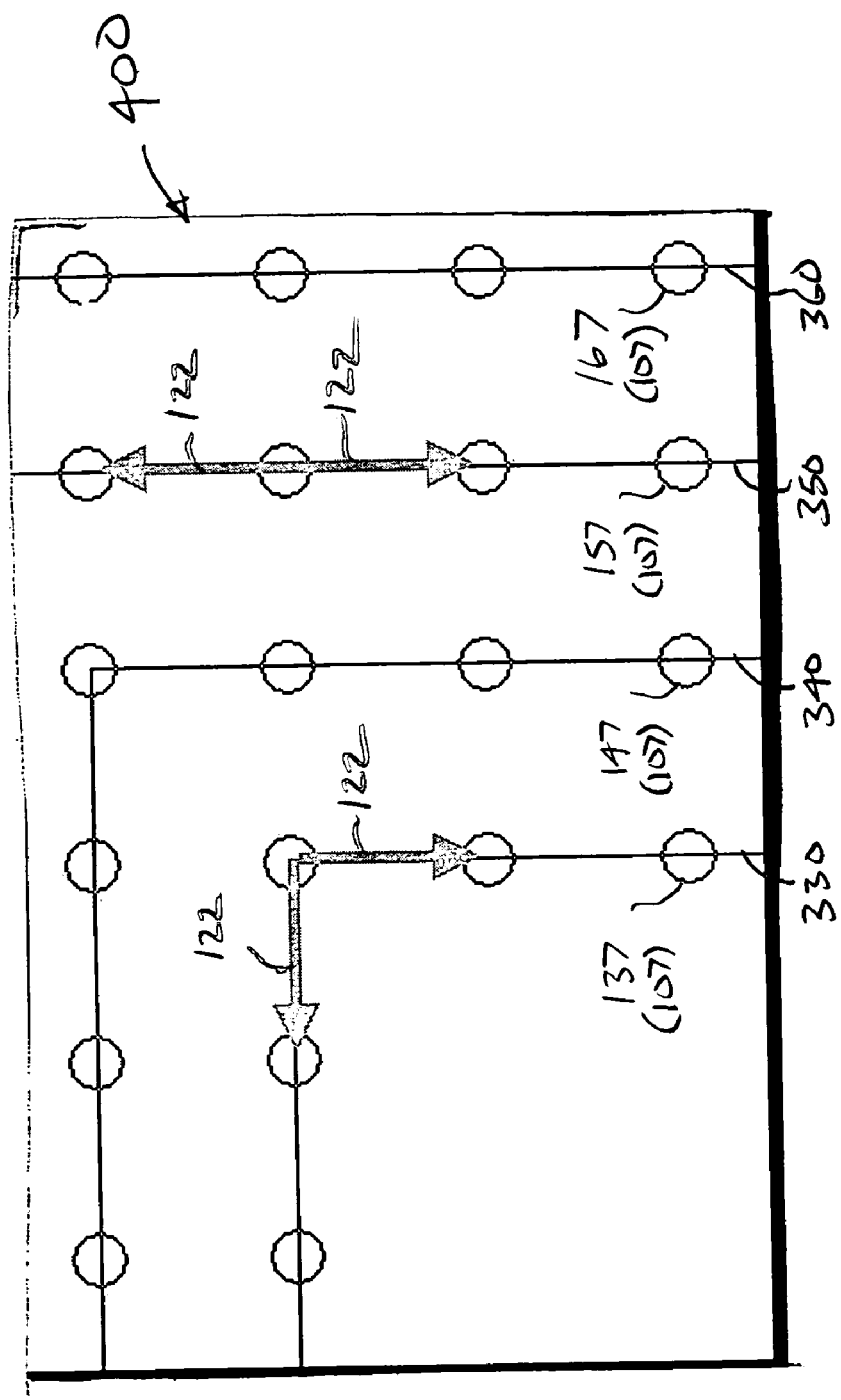
FIG. 4 illustrates a ring graph generated by the embodiments of the present invention.
Figure 5:
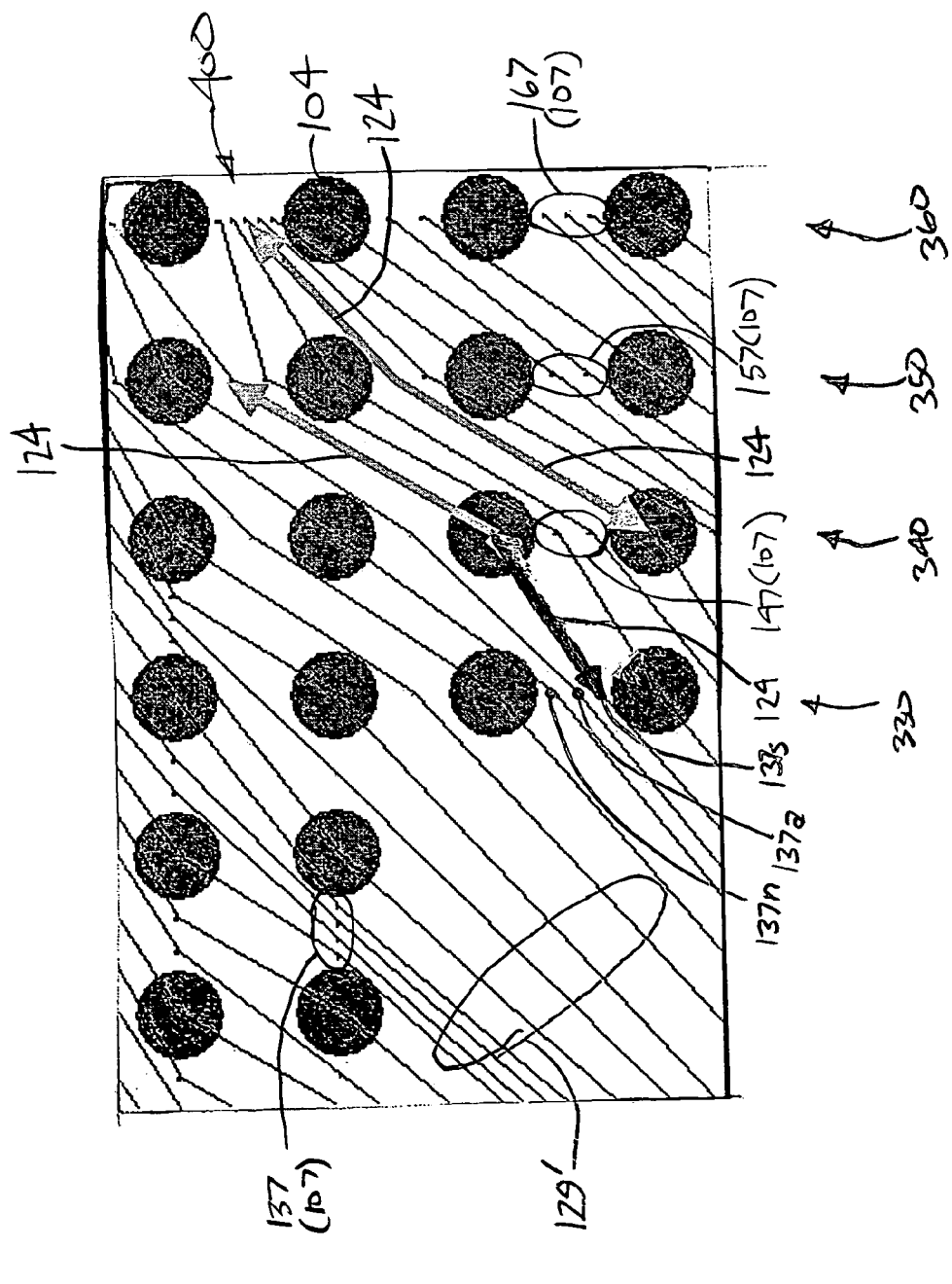
FIG. 5 illustrates an initial topological solution generated by embodiments of the present invention.

The topological paths 129' are routed using a matrix graph 300 and a ring graph 400 of the IC package 101. FIG. 3 depicts a portion of an example of a matrix graph 300 that denotes each ball pad 104 as a node. Each node has four links 120 connecting each ball pad 104 to the North, East, South and West. For each ball pad ring 130, 140, 150, 160 on each routing layer, a preferred embodiment creates a ring graph. In FIGS. 4 and 5, a ring graph 400 includes rings 330, 340, 350, and 360 for the respective ball pad rings 130, 140, 150, 160. The ring graph 400 includes nodes 107 that represents points in the ring graph 400 where topographical paths 129' (shown in FIG. 5) cross a ring 330, 340, 350, 360. These nodes 107 may also coincide with ball pads 104 or their vias. As illustrated in FIG. 4, each node 107 has two links 122 connecting to the clockwise and counterclockwise neighbor. And finally, as illustrated in FIG. 5, each node 107 in the ring graph 400 has two links 124 called "in" and "out" that are initially empty. The "in" and "out" for each node 107 is stored in memory denoting the location where a topological path 129' enters and exits a graph ring 330, 340, 350, 360.

Figure 7:
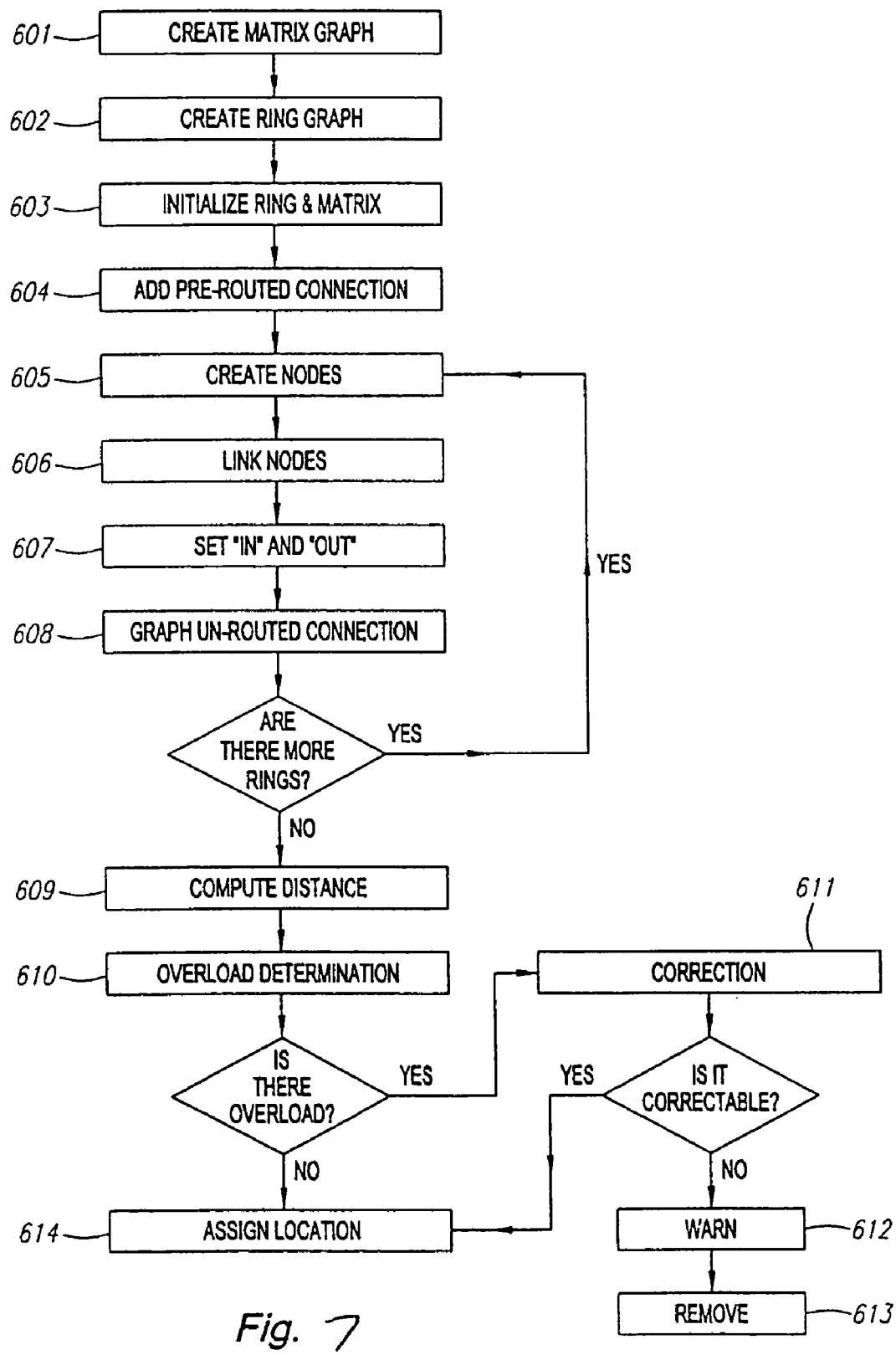
FIG. 7 illustrates a flow chart of the steps comprising the method of determining an Integrated Circuit (IC) package interconnect routing.

FIG. 7 illustrates a flow chart of the steps involved to create a global topological routine solution, and then a geometric solution. In steps 601 and 602, the embodiment generates the matrix graph 300 and ring graph 400. In step 603, the embodiment initializes the matrix graph 300 and ring graph 400 with the ball pads 104 or their vias. In step 604, the embodiment adds any pre-routed connections. These pre-routed connections are placed in particular locations that may not be varied according to the design of the IC package 101. In step 605, the embodiment creates nodes 137 in the ring graph 400 corresponding to the location where the pre-routed connections cross the rings 330, 340, 350, 360. In step 606, each node 137 is connected to its clockwise and counterclockwise neighbors via links 122. For example, in FIG. 5, node 137a is created in graph ring 330 and is linked to its clockwise 137s and counterclockwise 137n neighbors. In step 607, the method connects each node 137 of a graph ring 330, 340, 350, 360 to a corresponding node in neighboring rings via "in" and "out" links 224 In the example given, a node 147 in the graph ring 340 is connected to corresponding nodes 137, 157 in the neighboring rings 330, 350 via links 124, and a node 157 in the graph ring 350 is connected to corresponding nodes 147, 167 in the neighboring rings 340, 360 via links 124.

Next in step 608, the un-routed connections are graphed by repeating steps 605–607 for the unrouted connections. First, the bond pads 106 requiring a connection to ball pads 104 in the first ring 130 are connected. Then, all of the other bond pads 106 are connected to the first pad ring 130. Once all of the bond pads have been connected to the first ring 130, for example, the the nodes 137 are balanced to optimize the solution. To balance the nodes, the the loading between pairs of nodes 137 is loaded. The loading between a pair of nodes 137 is the total distance between the nodes minus the sum of the widths of all boundaries minus the sum of the required clearances between boundaries. The method improves the loading between pairs of nodes by moving a connection whenever possible.

The process is repeated for each remaining pad ring 140, 150, 160 until no further connections to each subsequent ring are needed. The connections are plotted for the next ring 140 and so on, working from the innermost ring 140 to the outermost ring 160. In this manner the most efficient routing plot is determined for each connection between bond pad 106 and ball pads 104 located in pad rings 130, 140, 150, 160. During the graphing of the topological solution, topological paths 129' are deemed to have no width nor are they considered to require any clearance, except when balancing nodes 107 (i.e. 137, 147, 157, 167). In this manner, the embodiment concentrates on determining the optimal routing solution. In addition, since the topological solution contains far less information than the geometric state, a global router consistent with the invention can select paths much faster than a geometric router. Several topological paths 129' regardless of the limited space between ball pads 104 may be plotted through ball pad 104 nodes. In step 609, the embodiment uses additional algorithms to further balance the nodes 107 (i.e. 137, 147, 157, 167) to optimize the routing design. It is noted at this time that the solution may contain several topological paths 129' plotted through the same region 110 or may cross over a ball pad 104 but are not electrically connected. At this point in the methodology the embodiment is not concerned with these overlaps. The embodiment is concerned with each node 107 (i.e. 137, 147, 157, 167) as it crosses each graph ring 330, 340, 350, 360 and its links to other nodes 107 (i.e. 137, 147, 157, 167).

Now an embodiment of the present invention will consider routing widths and required clearance distances. Now that the global topological solution has been determined, the method attempts to create a geometric solution. In step 609, the embodiment computes the distance between the nodes 107 (i.e. 137, 147, 157, 167) and the clearance actually needed between the nodes 107 (i.e. 137, 147, 157, 167). Collectively the nodes 107 (i.e. 137, 147, 157, 167), ball pads (104), and actual electrical tracks 129 are denoted as boundaries 115. In step 610, a determination of the existence of an overload condition is made. An overload condition exists if the loading of a pair of nodes 107 is negative. Put another way, if the sum of boundaries 115 exceeds the dimensions of the region, an overload condition exists.

If any of the channels (denoted as regions 110) between boundaries 115, are deemed to be overloaded, the method attempts to correct the overload condition in step 611, using pin swapping, jumping over any unused ball pads 104, and any other method available to the method. If embodiment cannot find a proper geometric solution, it writes a detailed warning message in step 612 to the log file for the user. The embodiment then proceeds to step 613 and marks the electrical track 129 as not routable and removes it from the graph.

Figure 6:
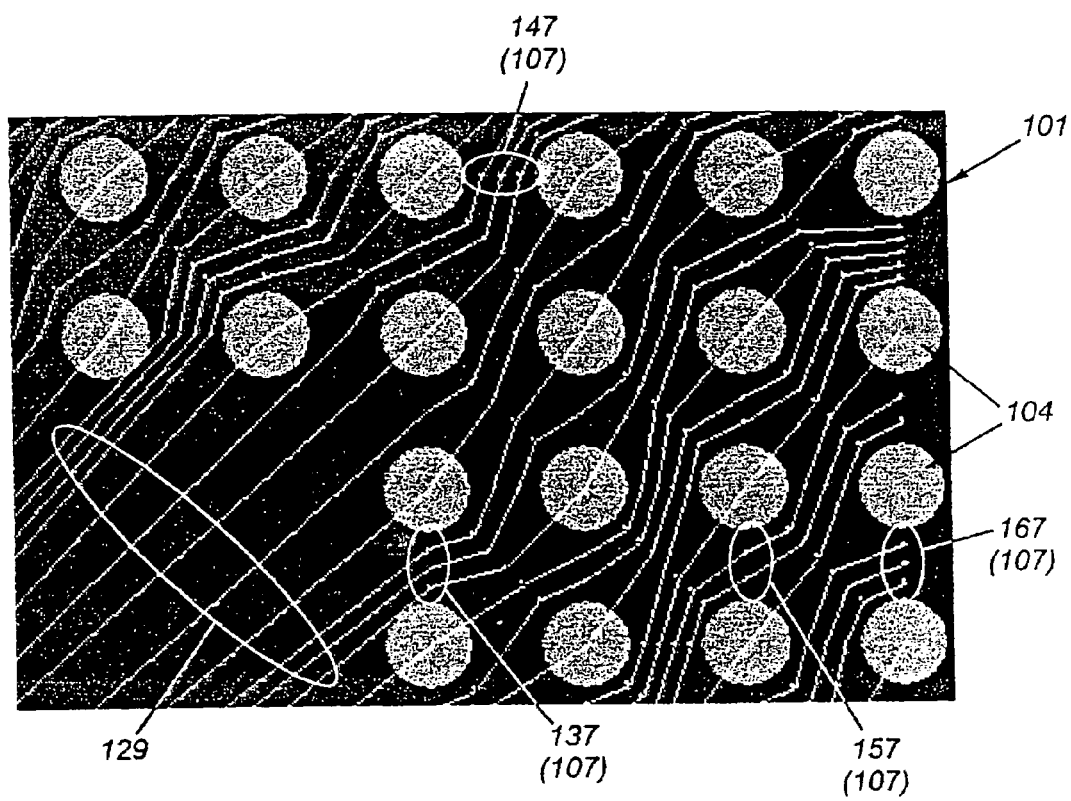
FIG. 6 illustrates a possible optimal geometric solution generated by embodiments of the present invention.

Once there is sufficient space available to fit (at least theoretically) all the required etch tracks for electrical tracks 129 between each node 107 (i.e. 137, 147, 157, 167), the embodiment then assigns locations to each node 107 (i.e. 137, 147, 157, 167) in step 613. FIG. 6 illustrates an optimized geometric solution derived from the global topological solution. As shown in FIG. 6 the electrical tracks 129 have been re-routed to more accurately depict the actual path of each electrical track 129 as it navigates a path among the ball pads 104.

Finally, in step 614, the assigned locations of each node 107 (i.e. 137, 147, 157, 167) are recorded in a database as "guide points." A detail router will later use these "guide points" as corners when routing.

FIG. 8 illustrates a system capable of performing the steps to determine an interconnect routing solution according to various embodiments of the present invention. In an embodiment of the invention, execution of the sequences of instructions required to practice the invention is performed by a single computer system 700. According to other embodiments of the invention, two or more computer systems 700 coupled by a communication link 715 may perform the sequence of instructions required to practice the invention in coordination with one another. In order to avoid needlessly obscuring the invention, a description of only one computer system 700 will be presented below; however, it should be understood that any number of computer systems 700 may be employed to practice the invention.

A computer system 700 according to an embodiment of the invention will now be described with reference to FIG. 8, which is a block diagram of the functional components of a computer system 700 according to an embodiment of the invention. As used herein, the term computer system 700 is broadly used to describe any computer that can store and independently run one or more programs, e.g., a personal computer, a server computer, a portable laptop computer, or a personal data assistants ("PDA").

Each computer system 700 may include a communication interface 714 coupled to the bus 706. The communication interface 714 provides two-way communication between computer systems 700. The communication interface 714 of a respective computer system 700 transmits and receives electrical, electromagnetic or optical signals that include data streams representing various types of information, including instructions, messages and data. A communication link 715 links one computer system 700 with another computer system 700. The communication link 715 may be a LAN, in which case the communication interface 714 may be a LAN card. Alternatively, the communication link 715 may be a PSTN, in which case the communication interface 714 may be an integrated services digital network (ISDN) card or a modem. Also, as a further alternative, the communication link 715 may be a wireless network.

A computer system 700 may transmit and receive messages, data, and instructions, including program, i.e., application, code, through its respective communication link 715 and communication interface 714. Received program code may be executed by the respective processor(s) 707 as it is received, and/or stored in the storage device 710, or other associated non-volatile media, for later execution. In this manner, a computer system 700 may receive messages, data and/or program code in the form of a carrier wave.

In an embodiment, the computer system 700 operates in conjunction with a data storage system 731, wherein the data storage system 731 contains a database 732 that is readily accessible by the computer system 700. In alternative embodiments, the database 732 may be stored on another computer system 700, e.g., in a memory chip and/or hard disk. In yet alternative embodiments, the database 732 may be read by the computer system 700 from one or more floppy disks, CD-ROMs, or any other medium from which a computer can read. In an alternative embodiment, the computer system 700 can access two or more databases 732, stored in a variety of mediums, as previously discussed.

A computer system 700 includes a bus 706 or other communication mechanism for communicating instructions, messages and data, collectively, information, and one or more processors 707 coupled with the bus 706 for processing information. A computer system 700 also includes a main memory 708, such as a random access memory (RAM) or other dynamic storage device, coupled to the bus 706 for storing dynamic data and instructions to be executed by the processor(s) 707. The main memory 708 also may be used for storing temporary data, i.e., variables, or other intermediate information during execution of instructions by the processor(s) 707.

A computer system 700 may further include a read only memory (ROM) 709 or other static storage device coupled to the bus 706 for storing static data and instructions for the processor(s) 707. A storage device 710, such as a magnetic disk or optical disk, may also be provided and coupled to the bus 706 for storing data and instructions for the processor(s) 707.

A computer system 700 may be coupled via the bus 706 to a display device 711, such as, but not limited to, a cathode ray tube (CRT), for displaying information to a user. An input device 712, including alphanumeric and other keys, is coupled to the bus 706 for communicating information and command selections to the processor(s) 707. Another type of user input device may include a cursor control 713, such as, but not limited to, a mouse, a trackball, a fingerpad, or cursor direction keys, for communicating direction information and command selections to the processor(s) 707 and for controlling cursor movement on the display 711.

According to one embodiment of the invention, an individual computer system 700 performs specific operations by their respective processor(s) 707 executing one or more sequences of one or more instructions contained in the main memory 708. Such instructions may be read into the main memory 708 from another computer-usable medium, such as the ROM 709 or the storage device 710. Execution of the sequences of instructions contained in the main memory 708 causes the processor(s) 707 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 707. Such a medium may take many forms, including, but not limited to, non-volatile, volatile and transmission media. Non-volatile media, i.e., media that can retain information in the absence of power, includes the ROM 709. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Various forms of computer-usable media may be involved in providing one or more sequences of one or more instructions to the processor(s) 707 for execution. For example, the instructions may initially be provided on a magnetic disk of an external computer system 700 (not shown). The external computer system 700 may load the instructions into its dynamic memory and then transit them over a telephone line, using a modem. A modem coupled to the local computer system 700 may receive the instructions on a telephone line and use an infrared transmitter to convert the instruction signals transmitted over the telephone line to corresponding infrared signals. An infrared detector (not shown) coupled to the bus 706 may receive the infrared signals and place the instructions therein on the bus 706. The bus 706 may carry the instructions to the main memory 708, from which the processor(s) 707 thereafter retrieves and executes the instructions. The instructions received by the main memory 708 may optionally be stored on the storage device 710, either before or after their execution by the processor(s) 707.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

While preferred embodiments of the invention have been described herein, many variations are possible which remain within the concept and scope of the invention. Such variations would become clear to one skilled in the art upon perusal of the description of the embodiments set forth herein.

What is claimed:

1. A method of determining an interconnect routing solution for a plurality of pads arranged in nested rings, comprising:
   providing a set of constraints associated with the plurality of pads;
   determining a global topological solution based on the set of constraints, the global topological solution determination comprising generating a ring graph having rings corresponding to the nested pad rings, each graph ring comprising a plurality of nodes representing points where topological paths cross the respective graph ring; and
   determining a geometric routing solution based on the global topological solution.

2. The method of claim 1, wherein the determining the global topological solution comprises generating a matrix graph, the matrix graph comprises a plurality of nodes representing the plurality of pads and four links linking at least one of the matrix nodes to a node to the North, East, South, and West, and wherein the ring graph is generated based on the matrix graph.

3. The method of claim 2, wherein the determining the global topological solution further comprises graphing pre-routed electrical routing segments to corresponding nodes in the matrix graph.

4. The method of claim 2, wherein the each graph ring connects at least two nodes associated with two pads in a corresponding pad ring.

5. The method of claim 1, wherein the ring graph comprises links connecting each node of a graph ring to a clockwise neighbor node and a counterclockwise neighbor node in the graph ring.

6. The method of claim 1, wherein the ring graph comprises at least one link joining a node in one of the graph rings with another node in another one of the graph rings.

7. The method of claim 1, wherein the determining the global topological solution comprises graphing un-routed electrical routing segments to corresponding nodes in the ring graph.

8. The method of claim 7, wherein the graphing of the un-routed electrical routing segments comprises graphing all un-routed electrical routing segments from the plurality of terminals to corresponding nodes in an innermost graph ring, and then graphing all un-routed electrical routing segments from the corresponding nodes in innermost ring graph to corresponding nodes in a next outer graph ring.

9. The method of claim 7, further balancing the nodes within each graph ring after each graphing of electrical routing segments to corresponding nodes.

10. The method of claim 1, wherein the determining the geometric routing solution comprises determining whether an overload condition exists.

11. The method of claim 10, further comprising correcting an overload condition if it exists.

12. The method of claim 10, further comprising warning a user of a detected overload condition.

13. The method of claim 1, further comprising plotting electrical routing segments in accordance with the geometric routing solution.

14. The method of claim 1, wherein the pad rings are rectangular.

15. A computer usable medium having a set of programmed instructions, the execution of which causes one or more processors to perform a sequence of steps, the steps comprising:
   determining a global topological solution based on a set of constraints, the set of constraints associated with a plurality of pads arranged in nested rings, the global topological solution determination comprising generating a ring graph having rings corresponding to the nested pad rings, each graph ring comprising a plurality of nodes representing points where topological paths cross the respective graph ring; and
   determining a geometric routing solution based on the global topological solution.

16. The computer usable medium of claim 15, wherein the determining the global topological solution comprises generating a matrix graph, the matrix graph comprises a plurality of nodes representing the plurality of pads and four links linking at least one of the matrix nodes to a node to the North, East, South, and West, and wherein the ring graph is generated based on the matrix graph.

17. The computer usable medium of claim 16, wherein the determining the global topological solution further comprises graphing pre-routed electrical routing segments to corresponding nodes in the matrix graph.

18. The computer usable medium of claim 15, wherein the each ring graph connects at least two nodes associated with two in a corresponding pad ring.

19. The computer usable medium of claim 15, wherein the ring graph comprises links connecting each node of a graph ring to a clockwise neighbor node and a counterclockwise neighbor node in the graph ring.

20. The computer usable medium of claim 15, wherein the ring graph comprises at least one link joining a node in one of the graph rings with another node in another one of the graph rings.

21. The computer usable medium of claim 15, wherein the determining the global topological solution comprises graphing un-routed electrical routing segments to corresponding nodes in the ring graph.

22. The computer usable medium of claim 21, wherein the graphing of the un-routed electrical routing segments comprises graphing all un-routed electrical routing segments from the plurality of terminals to corresponding nodes in an innermost graph ring, and then graphing all un-routed electrical routing segments from the corresponding nodes in innermost ring graph to corresponding nodes in a next outer graph ring.

23. The computer usable medium of claim 21, wherein the steps further comprise balancing the nodes within each graph ring after each graphing of electrical routing segments to corresponding nodes.

24. The computer usable medium of claim 15, wherein the determining the geometric routing solution comprises determining whether an overload condition exists.

25. The computer usable medium of claim 24, further comprising additional programmed instructions, the execution of which causes one or more processors to correct an overload condition if it exists.

26. The computer usable medium of claim 24, further comprising additional programmed instructions, the execution of which causes one or more processors to warn a user of a detected overload condition.

27. The computer usable medium of claim 15, further comprising additional programmed instructions, the execution of which causes one or more processors to plot electrical routing segments in accordance with the geometric routing solution.

28. The computer usable medium of claim 15, wherein the pad rings are rectangular.

29. A system for determining interconnect routing solution, comprising:
means for determining a global topological solution based on a set of constraints, the set of constraints associated with a plurality of pads arranged in nested rings, the global topological solution determination comprising generating a ring graph having rings corresponding to the nested pad rings, each graph ring comprising a plurality of nodes representing points where topological paths cross the respective graph ring; and
means for determining a geometric routing solution based on the global topological solution.

30. The system of claim 29, wherein the means for determining the global topological solution comprises means for generating a matrix graph, the matrix graph comprises a plurality of nodes representing the plurality of pads and four links linking at least one of the matrix nodes to a node to the North, East, South, and West, and wherein the ring graph is generated based on the matrix graph.

31. The system of claim 30, wherein the means for determining the global topological solution further comprises means for graphing pre-routed electrical routing segments to corresponding nodes in the matrix graph.

32. The system of claim 29, wherein the means for determining the global topological solution further comprises means for generating one or more ring graphs, each ring graph comprises a line that connects at least two nodes associated with two of the plurality of pads.

33. The system of claim 29, wherein the ring graph comprises links connecting each node of a graph ring to a clockwise neighbor node and a counterclockwise neighbor node in the graph ring.

34. The system of claim 29, wherein the ring graph comprises at least one link joining a node in one of the graph rings with another node in another one of the graph rings.

35. The system of claim 29, wherein the means for determining the global topological solution comprises means for graphing un-routed electrical routing segments to corresponding nodes in the ring graph.

36. The system of claim 35, wherein the means for graphing the un-routed electrical routing segments comprises means for graphing all un-routed electrical routing segments from the plurality of terminals to corresponding nodes in an innermost graph ring, and then graphing all un-routed electrical routing segments from the corresponding nodes in innermost ring graph to corresponding nodes in a next outer graph ring.

37. The system of claim 35, further comprising means for balancing the nodes within each graph ring after each graphing of electrical routing segments to corresponding nodes.

38. The system of claim 29, wherein the means for determining the geometric routing solution comprises means for determining whether an overload condition exists.

39. The system of claim 38, further comprising means for correcting an overload condition if it exists.

40. The system of claim 38, further comprising means for warning a user of a detected overload condition.

41. The system of claim 29, further comprising means for plotting electrical routing segments in accordance with the geometric routing solution.

* * * * *